Nov. 4, 1947.   V. A. HOOVER   2,430,174
ELECTROMAGNETIC CLUTCH AND BRAKE
Filed Nov. 6, 1943

Inventor
VAINO A. HOOVER
By Samuel Scrivener Jr.
Attorney

Patented Nov. 4, 1947

2,430,174

UNITED STATES PATENT OFFICE 2,430,174

ELECTROMAGNETIC CLUTCH AND BRAKE

Vaino A. Hoover, Los Angeles, Calif., assignor to Electrical Engineering and Manufacturing Corporation, Los Angeles, Calif., a corporation of California Application November 6, 1943, Serial No. 509,296

5 Claims. (Cl. 192—18)

This invention relates primarily to clutches and, more particularly, to clutches which are operated to driving engagement by magnetic means.

The principal object of the invention has been to provide a magnetically-operated clutch device in which the magnetic operating field is highly concentrated by the structure of the clutch itself thereby providing increased clutching force. It has also been an object to concentrate the magnetic operating flux at a part of the clutch removed from the area of actual engagement between the driving and driven parts, in order that any destruction of the magnetic properties of the material of the clutch members, as by heat due to slipping, will not affect the clutch operation. It has been a further object to provide a magnetic clutch in which the driving and driven members engage only over an area of maximum distance from the shaft, whereby a clutch of maximum torque transmitting characteristics is provided. A still further object has been to provide a magnetically-operated clutch in which a maximum part of the magnetic circuit is through fixed, rather than rotating, parts. In this connection, a further object has been to provide a clutch assembly and device in which the fixed parts included in the magnetic circuit are so constructed that substantially constant flux density obtains throughout all parts thereof. A still further object has been to provide a magnetically-operated clutch in which all parts included in the magnetic circuit are of magnetic material and in which the only air gaps in the magnetic circuit are at minimum radius from the axis of the clutch assembly.

It is a still further object of the invention to provide an electric motor and clutch assembly in which the windings of the motor and the energizing coil of the clutch are so connected that the energizing force of the clutch-operating coil is varied with the energization of the motor windings as the load on the motor varies.

Other objects and features of novelty of the invention will be made apparent by the following description and the annexed drawings which, it will be understood, are only illustrative of the invention and impose no limitation thereon not imposed by the appended claims.

Figure 1:
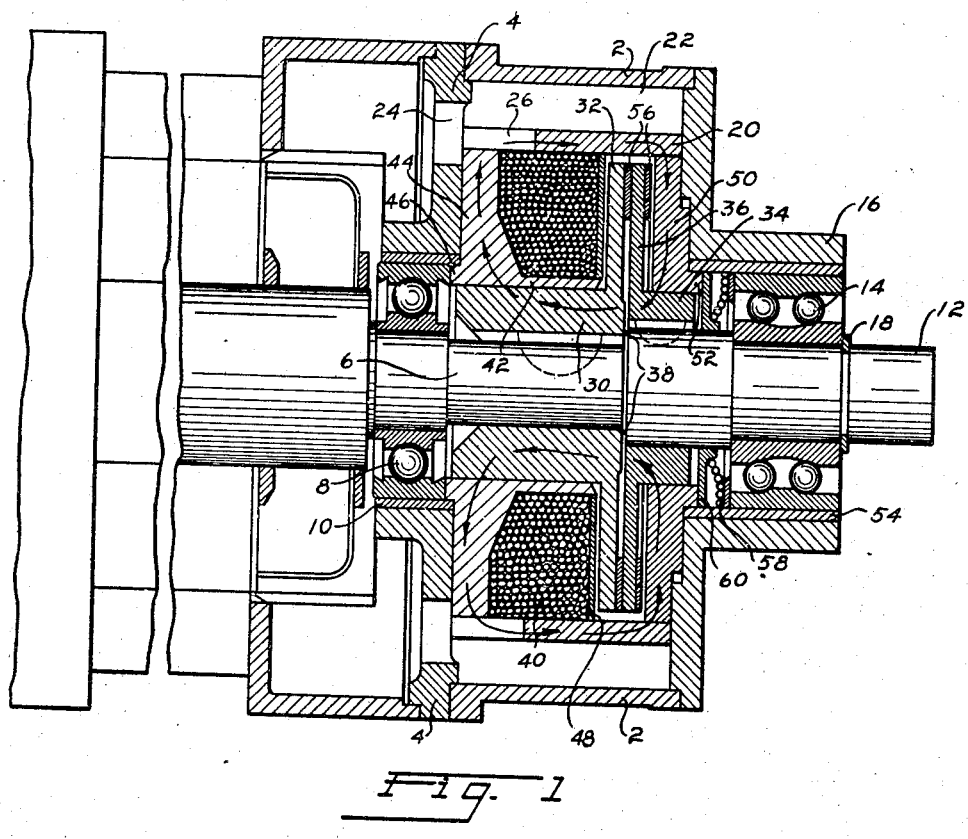
Figure 2:
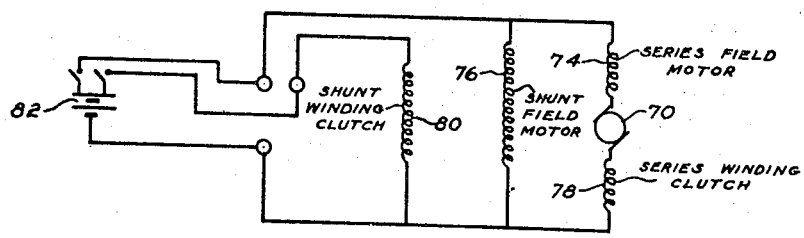

Referring to the drawings, in which similar reference numerals refer to like parts, Fig. 1 is a longitudinal sectional view of a clutch assembly according to my invention, and Fig. 2 is a circuit diagram showing the interconnection of the motor windings and the clutch energizing coils of my invention.

In Fig. 1 of the drawings there is shown a clutch assembly and device according to this invention and which is illustrated as being disposed within a housing 2 which may be attached to the drive end of an electric motor, a partition 4 being provided to separate the motor and clutch. A drive shaft 6, which may be the armature shaft of the electric motor, extends into housing 2 and is supported by a bearing 8 which is positioned and supported by a ring 10 which is pressed into an opening in wall 4 and extends therethrough. A driven shaft 12 also extends into housing 2 in axial alignment with the driving shaft and is supported by a bearing 14 which is carried by a reduced diameter extension 16 of housing 2. The driven shaft is mounted for slight axial movement and the inner race of the bearing 14 is attached thereto by a ring 18 for movement with the shaft. A cylindrical shell 20 concentrically surrounds shafts 6 and 12 within housing 2 and is substantially spaced therefrom to provide an inner space within which the clutch device is positioned and to provide an exterior space 22 within which electrical wiring may be positioned. Openings 24 and 26 are provided in the wall 4 and shell 20 in order to permit the passage of wiring and also the passage of cooling air.

The clutch device according to this invention comprises a driving member and a driven member. The driving member is keyed to the armature shaft 6 and comprises a hub part 30 and a disc 32 extending radially from the hub adjacent the end of shaft 6. The driven member is keyed to the driven shaft 12 and comprises a hub part 34 and a disc 36 which extends radially from the hub adjacent the end of shaft 12 and is parallel and closely adjacent to the driving clutch disc 32. The hub 30 of the driving clutch member is axially elongated and of substantial thickness and on the outer face thereof adjacent the driven clutch member is provided with an axial extension 38 of lesser diameter than the hub. A spool is provided on which a clutch energizing coil 40 is wound, and comprises an axially elongated sleeve 42 closely surrounding the hub 30 and a radially-extending part 44 which extends from the sleeve at a part thereof remote from the clutch disc 32 and which decreases in thickness with radial distance from the sleeve 42. The spool is fixed against rotation with the driving clutch member and is supported concentrically with the hub 30 thereof by means of an annular flange 46 which extends rearwardly from the spool member and is received and positioned within the ring 10 which surrounds and positions the bearing 8.

The outer periphery of the radially-extending part 44 of the spool member is tightly engaged by the inner periphery of the fixed cylindrical shell 20. The energizing coil 40 is wound on sleeve 42 and is laterally confined by the radially-extending part 44 and by a retaining plate 48 which tightly surrounds the sleeve 42 at the free end thereof. The hub 34 of the driven clutch member has the same external diameter as the hub 30 of the driving clutch member and is substantially elongated rearwardly of the disc 36 to provide a radial magnetic flux path to a fixed brake disc 50 which has a flat radial face adjacent the driven disc 36 and a stepped or tapered rear face whereby the thickness of the brake disc decreases with radial distance from the hub 34. The brake disc is supported and centered in the reduced-diameter housing extension 16 by means of a rearwardly-extending flange 52 which is received in a ring 54 which surrounds the bearing 14. The outer periphery of the brake disc is tightly engaged by the inner periphery of the fixed cylindrical shell 20.

The driving and driven discs 32, 36 are made as thin as strength requirements will permit. At their outermost peripheral parts both faces of the driven disc 36 are provided with clutch facings 56 which are preferably formed of non-magnetic material and are preferably attached to or deposited on the disc in the manner disclosed and claimed in my co-pending application Serial No. 509,290, filed November 6, 1943. The friction facings 56 provide the only area of engagement between the two discs or between the driven disc and the brake disc, the two discs being otherwise closest together at the axes thereof adjacent the hub extension 38. A compression spring 58 bears at its one end on the outer race of bearing 14 and at its other end on a bronze ring 60 which bears on the fixed brake disc, thereby constantly urging the bearing 14 and shaft 12 to the right as viewed in Fig. 1 to normally maintain the driven disc 36 in braking engagement with the brake disc 50.

In the operation of the clutch, so long as the operating coil 40 is de-energized the spring 58 will maintain driven shaft 12 and the driven clutch member in such position that the driven disc will be out of engagement with the driving clutch disc and in tight and braking engagement with the brake disc, thereby holding shaft 12 from rotation. Upon energization of the operating coil, a magnetic field will be set up which will move the driven clutch disc, against the force of spring 58, out of engagement with the brake disc and into driving engagement with the driving disc, thereby transmitting to the driven shaft any rotation of the driving shaft.

The lines of force of the magnetic field which will be set up on energization of the coil 40 will follow the arrows shown in Fig. 1, and will therefore extend through driving disc hub 30, the radial part 44 of the coil-supporting spool, cylindrical shell 20, brake disc 50 and driven clutch hub 34. The axial hub extension 38 on the driving member causes a very narrow gap to exist between the driving and driven members over a reduced area adjacent the common axis thereof, thereby producing a very highly concentrated field at that area. The discs of the two clutch members are not in the path of the magnetic field and the thinness of the discs and the non-magnetic facings thereon prevent any leakage through the discs. It will be seen that the hubs 30, 34 of the driving and driven members are the only moving parts included in the magnetic circuit, the remainder of the entire path being through fixed members, whereby closely fitting parts may be used in order to reduce air gap losses. It will also be seen that the thickness of the various parts decreases with radial distance from the common axis of the shafts. Thus hubs 30 and 34 are of greater thickness than cylindrical shell 20, while radial parts 44 and 50 taper in thickness from the axis. The normal increase in the area of each cylindrical section of these parts with increased radius is therefore compensated by the progressive reduction of the thickness, or axial extent, of the section with increased radius, whereby the area of each section of the path of magnetic flux is substantially constant throughout the radial extent of the parts, thus producing substantially constant flux density throughout the magnetic circuit.

The clutch described and illustrated produces the two beneficial results of concentration of the magnetic flux at the hub area of the clutch members and concentration of the driving engagement at a maximum radial distance from the axis of the shafts. The concentration of the flux at the hub area provides greater holding force than would be produced by spreading, or less concentration, of the flux at the pole face between the driving and driven discs and, in addition, localizes the flux at a part of the working faces of the clutch discs which is not utilized for actual driving engagement. It follows, therefore, that if, by reason of clutch slipping, or otherwise, the engaging parts of the clutch discs are sufficiently heated to adversely affect the magnetic qualities of the material thereof, the parts of the clutch discs which provide the principal magnetic circuit will not be so affected and the operation of the clutch will be unchanged. The concentration of the driving force over an area at the radially outermost part of the clutch causes maximum torque transmission. This, of course, is permissible only if the clutch holding force is a maximum and this effect is provided by the flux concentration at the hub area which is described hereinbefore.

Means are also provided by the invention for energizing the clutch-operating coils simultaneously with the windings of the associated electric motor and for causing the energizing force of the clutch-operating coils to change as the mode of energization of the motor windings is changed with variations in the load on the motor. Such means have to do with the interconnection of the motor field windings and the clutch-energizing winding and are illustrated in the circuit diagram of Fig. 2 of the drawings. As shown in this diagram the motor armature 70 is connected in series with a series field winding 74 and in parallel with a shunt field winding 76. A clutch operating coil 78 is connected in series with the winding 74 and a second clutch-operating coil 80 is connected in parallel with the shunt field winding 76. A source of electric energy 82 is connected to supply current to the described coils. If desired, the entire clutch-operating coil may be series-connected or parallel-connected, depending upon the requirements of the motor operation.

In certain applications of the invention it is desirable to operate the motor continuously and to operate the clutch intermittently to start and stop the driven load. This permits very high acceleration rates for starting the driven load without the detrimental effect of high inrush currents to the motor which would be necessary if the motor were started and stopped simultaneously with the driven load. In such applications the series clutch coil is entirely omitted and the operation of the clutch is obtained by energizing the shunt clutch coil. In other applications, in which it is desired to limit the maximum torque which the clutch will transmit, a relatively weak series clutch coil is employed and the larger part of the holding force of the clutch is obtained by the use of the shunt clutch coil. By means of this construction the holding force of the clutch increases only slightly with increase in motor load. Thus, if a heavy overload is encountered by the driven mechanism, such as occurs when a mechanical stop is encountered, the maximum torque transmitted by the clutch is limited and the clutch thus starts to slip so that the momentum of the rotating motor parts is not transmitted as a shock to the driven equipment. In other applications of the invention requiring very high starting torques, and in which it is desirable that no slippage takes place between the clutch faces, most of the clutch coil winding space is utilized for the series clutch coil and a relatively small proportion of the winding space is utilized for the shunt coil. The proportion of winding space utilized for the shunt clutch coil is only that which is required to bring and hold the clutch discs in driving relation under a very lightly loaded condition.

While I have described and illustrated one embodiment of my invention, it will be apparent to those skilled in the art that other embodiments may be made, as well as modifications of those disclosed, without departing in any way from the spirit or scope of the invention, for the limits of which reference must be had to the appended claims.

I claim:

1. A clutch mechanism for connecting a driving shaft to a driven shaft, comprising a driving clutch member having a hub of relatively great radial section attached to the driving shaft and a disc of relatively thin axial section extending radially therefrom, a driven clutch member having a hub of substantially the same radial extent as that of the driving clutch member attached to the driven shaft and a disc of relatively thin axial section extending radially therefrom and being parallel and adjacent the driving clutch disc, a fixed brake member surrounding and abutting the hub part of the driven clutch member, and means for establishing a magnetic field having a path through said hub parts and said fixed brake member.

2. A clutch mechanism according to claim 1, in which the magnetic gap between the hubs of the clutch members is less than that between the discs thereof.

3. A clutch mechanism according to claim 1, comprising in addition a fixed housing surrounding said clutch mechanism and engaging the outer periphery of said fixed brake member and forming part of the path of said magnetic field.

4. A clutch mechanism according to claim 1, comprising in addition a fixed member surrounding and abutting the hub part of the driving clutch member and having a part extending radially thereof, and a cylindrical shell surrounding said member and said fixed brake member and forming part of the part of said magnetic field.

5. A clutch mechanism for connecting a driving shaft to a driven shaft which is axially aligned therewith, comprising a driving clutch member having a hub part surrounding and attached to the driving shaft and a clutch disc extending radially therefrom, a driven clutch member comprising a hub part surrounding and attached to the driven shaft and having an end face closely adjacent the end face of the hub of the driving clutch member and having a clutch disc extending radially therefrom adjacent the driving clutch disc, a fixed brake member surrounding and abutting the hub part of the driven clutch member and having a radially extending flat face adjacent the driven clutch member, and means for establishing a magnetic field having a path extending through said hub parts and said fixed brake member.

VAINO A. HOOVER.

REFERENCES CITED

The following references are of record in the file of this patent:

UNITED STATES PATENTS

| Number | Name | Date |
|---|---|---|
| 747,706 | Hewlett | Dec. 22, 1903 |
| 803,410 | Eastwood | Oct. 31, 1905 |
| 1,193,678 | Fawle | Aug. 8, 1916 |
| 1,560,123 | Voigt | Nov. 3, 1925 |
| 1,622,261 | Payne | Mar. 22, 1927 |
| 1,856,481 | Hodgson | May 3, 1932 |
| 2,216,620 | List | Oct. 1, 1940 |
| 2,232,740 | Shaw | Feb. 25, 1941 |
| 2,267,114 | Lear et al. | Dec. 23, 1941 |
| 2,305,788 | Kemmler et al. | Dec. 22, 1942 |
| 2,315,298 | Thompson | Mar. 30, 1943 |
| 2,345,418 | Neuner | Mar. 28, 1944 |
| 2,354,854 | Doll | Aug. 1, 1944 |

FOREIGN PATENTS

| Number | Country | Date |
|---|---|---|
| 654,796 | Germany | Dec. 30, 1937 |
| 751,427 | France | June 19, 1933 |